US006936340B2

(12) United States Patent
Jakusch et al.

(10) Patent No.: US 6,936,340 B2
(45) Date of Patent: *Aug. 30, 2005

(54) MAGNETIC RECORDING MEDIUM

(75) Inventors: Helmut Jakusch, Frankenthal (DE); Albert Kohl, Laumersheim (DE); Peter Heilmann, Bad Dürkheim (DE); Ronald John Veitch, Maxdorf (DE); Ria Kress, Ludwigshafen (DE); Stefan Müller, Willsätt (DE); Johannes Sandrock, Kehl (DE); Hartmut Heene, Muldenstein (DE)

(73) Assignee: Imation Corp., Oakdale, MN (US)

( * ) Notice: Subject to any disclaimer, the term of this patent is extended or adjusted under 35 U.S.C. 154(b) by 455 days.

This patent is subject to a terminal disclaimer.

(21) Appl. No.: 09/826,901

(22) Filed: Apr. 6, 2001

(65) Prior Publication Data

US 2002/0009617 A1 Jan. 24, 2002

(30) Foreign Application Priority Data

Apr. 7, 2000 (DE) ....................... P 100 17 490

(51) Int. Cl.⁷ ............................ B32B 5/16; G11B 5/66; G11B 5/70
(52) U.S. Cl. ................... 428/220; 428/323; 428/328; 428/329; 428/330; 428/331; 428/332; 428/336; 428/339; 428/694 BS; 428/694 BA; 428/694 BM; 428/694 BH; 428/900
(58) Field of Search ................ 428/220, 328, 428/329, 330, 331, 332, 336, 339, 694 BS, 694 BA, 694 BM, 694 BH, 900, 323

(56) References Cited

U.S. PATENT DOCUMENTS

| 4,329,241 A | 5/1982 | Massart ................... 252/62.52 |
| 5,458,948 A | 10/1995 | Yanagita et al. ............ 428/141 |
| 5,601,647 A | 2/1997 | Pertzsch et al. ............ 118/419 |
| 5,641,355 A | * 6/1997 | Munch et al. ............... 118/410 |
| 5,704,978 A | 1/1998 | Maniwa et al. ............. 118/410 |
| 5,705,268 A | 1/1998 | Ishikawa et al. ............ 428/336 |
| 5,714,275 A | * 2/1998 | Yamazaki et al. ...... 428/694 B |
| 5,792,570 A | 8/1998 | Ishikawa et al. ...... 428/694 BA |
| 5,858,097 A | 1/1999 | Richter et al. ............. 118/411 |
| 5,989,703 A | * 11/1999 | Inoue et al. ................ 428/329 |
| 6,231,963 B1 | 5/2001 | Lehner et al. ............. 428/323 |
| 6,235,368 B1 | 5/2001 | Wiegemann et al. ...... 428/65.3 |

FOREIGN PATENT DOCUMENTS

| CA | 1066483 | 11/1979 |
| DE | 2642383 | 3/1977 |
| DE | 3027012 | 2/1981 |
| DE | 4427821 | 2/1996 |
| DE | 19504930 | 8/1996 |
| DE | 19747068 | 4/1999 |
| DE | 19838799 | 3/2000 |
| EP | 0654165 | 5/1995 |
| EP | 0592922 | 6/1999 |
| EP | 0818040 | 2/2000 |
| FR | 2734500 | 11/1996 |

OTHER PUBLICATIONS

Cover page of WO 00/13176 (including an English abstract).
English Language Abstract of DE 4427821.
English Language Abstract of JP 57175734.
Seiichi Hisano et al., "Research and Development of Metal Powder for Magnetic Recording", Journal of Magnetism and Magnetic Materials, vol. 190, pp. 371–381 (1998).

* cited by examiner

Primary Examiner—Sheeba Ahmed
(74) Attorney, Agent, or Firm—Eric D. Levinson

(57) ABSTRACT

Multilayer magnetic recording medium which is suitable for high recording densities and the recording of digital data, has very good electromagnetic recording properties and good surface smoothness and can absorb a large amount of lubricant in the lower layer and has at least one upper magnetic recording layer less than 0.5 μm thick and at least one lower layer which contains a magnetically soft pigment.

24 Claims, No Drawings

MAGNETIC RECORDING MEDIUM

CROSS-REFERENCE TO RELATED APPLICATIONS

The present application claims priority under 35 U.S.C. § 119 of German Patent Application No. P 100 17 490.6, filed Apr. 7, 2000, the disclosure of which is expressly incorporated by reference herein in its entirety.

BACKGROUND OF THE INVENTION

1. Field of the Invention

The present invention relates to a magnetic recording medium, in particular a multilayer magnetic recording medium having a thin upper magnetic recording layer which has good electromagnetic recording properties, a smooth surface and improved lubricant absorption in the lower layer, and a process for its production.

2. Discussion of Background Information

Magnetic recording media, for example magnetic tapes, floppy disks or magnetic cards, have long been known for the recording of analog or digital audio and video signals or for data recording.

There has for some years been an increasing need for media which are suitable for increasingly high recording densities, i.e., capable of storing large quantities of information in a very small space. Increasingly small thicknesses of the recording layer and magnetic pigments having increasingly small dimensions and increasingly high coercive forces are a precondition for this.

Binder-containing double-layer magnetic media in which production difficulties, arising from the reduction in the thickness of the upper recording layer, and mechanical stability problems can be compensated by a relatively thick lower layer without having to dispense with a high recording density became established some time ago. They have higher stability and better productivity during manufacture compared with the magnetic recording media of the ME (metal evaporated) type, which are also known and are very suitable for high recording densities.

For information storage, they have a very smooth magnetic upper layer which is generally less than 0.5 µm thick and contains magnetic pigments having a high coercive force, preferably metal pigments or pigments comprising metal alloys. A thicker, likewise pigmented, binder-containing lower layer is present between the generally nonmagnetic substrate and the magnetic recording layer. On the one hand, the lower layer is indispensable for the production process of such double layers, particularly when these have to be applied wet-in-wet for obtaining a very thin magnetic recording layer. On the other hand, it also influences many other properties, in particular the tape smoothness and the mechanical properties of such magnetic media.

The lower layers used here are layers which contain both magnetic and nonmagnetic inorganic pigments, as well as layers which contain only nonmagnetic pigments in addition to binders and conventional additives. In publications and practical examples, it has now been shown that magnetic recording media having such a magnetic double layer and those having a nonmagnetic layer between substrate and recording layer substantially surpass the storability of corresponding magnetic particulate monolayer tapes having ferromagnetic metal powder in the recording layer.

It is known that, in the case of magnetic recording media having a double layer, the magnetic storability, i.e., the recording density, or the signal level depends primarily on the properties of the upper layer. Parameters which have an effect include their magnetic properties, their surface smoothness, the pigment type used and the thickness of the upper layer.

In addition, however, it has also been found that the lower layer, which does not come into contact with the head, also has considerable influence on the properties of the medium as a whole.

For example, it is only through specially established Theological properties of the lower layer dispersion in relation to the upper layer dispersion that it has become at all possible to achieve the desired small thickness of the upper layer in wet-in-wet coating. If, moreover, the lower layer has an excellent dispersion quality, it can cover roughnesses of the substrate film and thus form a good base layer for a smooth upper layer. On the other hand, with its high porosity and adapted hardness, it substantially supports the surface smoothing process in the calendering of the medium.

Further important functions of the lower layer are, for example, the establishment of electrical and mechanical properties of the tape, such as conductivity, scratch resistance, rigidity (modulus of elasticity) and good running properties (coefficients of friction). In order to maintain low coefficients of friction of the tape over long operating periods, the lower layer must be capable of storing a sufficiently large stock of lubricant, which subsequently gradually reaches the tape surface through diffusion.

In addition to the development of magnetic pigments having a high coercive force and recording layers having the desired properties, it has therefore long been the object of many development efforts also to provide suitable or improved lower layers in order to further to enhance the recording properties of magnetic, particulate double-layer recording media. In this way, it is also intended to increase their attractiveness compared with the abovementioned ME media.

It has proven advantageous to vary specific parameters in order to achieve an improvement in the lower layers thereby. These include, for example, the choice of particularly suitable lower layer pigments or pigment compositions, such as $TiO_2$, carbon blacks, metal oxides, supporting pigments; the optimization of their shape and size, such as needles, spindles, finely divided character, homogeneity; and the improvement of their dispersibility, such as surface finishing, production process with little sintering. In addition to nonmagnetic pigments, magnetic pigments were also used in the lower layer, generally as a mixture with larger or smaller amounts of nonmagnetic pigments, with the result that desired additional properties could also be obtained in many cases.

Thus, DE-A-198 38 799 describes a double-layer magnetic recording medium which contains a magnetic pigment in the lower layer, which has a lower coercive force than the upper layer, with the result that particularly good overwritability of such double layers could be achieved.

EP-A-0 818 040 discloses a tape-like magnetic recording medium which has a plurality of layers and, owing to the use of weakly magnetic, acicular pigments in the lower layer, achieves, inter alia, excellent moduli of elasticity of double-layer tapes.

Such weakly magnetic pigments in the lower layer can, as described in DE-A-197 47 068, also lead to particularly good orientability of lamellar double-layer media.

Magnetic recording media having a plurality of layers, in which nonmagnetic pigments alone, as a mixture with magnetic pigments or as a mixture with magnetically soft pigments are used in the lower layer, have also been disclosed. Such media have been described, for example, in EP-A-0 592 922 and in U.S. Pat. No. 5,458,948.

In spite of a different composition of the lower layers, the media exhibit no significant differences in their electromagnetic and other properties.

U.S. Pat. No. 5,792,570 relates, inter alia, to a multilayer recording medium in which the smoothness of the magnetic layer and the C/N ratio in the radio frequency range are said to be improved by the use of magnetically soft pigments in the magnetic recording layer and, if required, also in a lower layer. However, nonmagnetic lower layers and lower layers comprising magnetically soft pigments show no differences in the desired properties.

U.S. Pat. No. 5,705,268 describes multilayer magnetic recording media which have a magnetic recording layer comprising ferromagnetic metal powders or hexagonal ferrites and whose lower layer contains a magnetically soft pigment having a narrow particle size distribution. These recording media are said to have a smoother magnetic layer surface, better overwritability and a better output level in the radio frequency range compared with media having nonmagnetic lower layers.

The magnetically soft pigments used in the lower layer are either ferrites of the spinel type or magnetically soft metal alloy powders, which can generally be prepared only by expensive processes and/or by the use of relatively high temperatures.

In these media, however, the porosity of the lower layer is as a rule not sufficient for absorbing relatively large amounts of lubricants, which is evident from higher coefficients of friction of the tape after prolonged operation. Furthermore, there is still a need for magnetic recording media which have even better surface smoothness and improved output levels at short recording wavelengths.

SUMMARY OF THE INVENTION

The present invention relates to providing a multilayer magnetic recording medium for high recording densities, which recording medium contains a magnetic pigment having a high coercive force in the upper magnetic layer and magnetically soft pigments in the lower layer and has excellent electromagnetic recording properties, in particular a high RF output level and improved surface roughness and is capable of storing sufficiently large amounts of lubricants in the lower layer.

The present invention also relates to using, in the lower layer, magnetically soft pigments which are distinguished by a very finely divided character and are more economical to prepare than conventional pigments for the lower layer.

The present invention also relates to providing a process for the production of such magnetic recording medium.

According to the present invention, there is provided a multilayer magnetic recording medium which has, on a nonmagnetic substrate, at least one upper binder-containing magnetic recording layer which has a thickness of less than 0.5 µm and contains a finely divided magnetic pigment having a coercive force $H_c$ of 100–250 kA/m, and at least one lower binder-containing layer which contains an isotropic, magnetically soft pigment which is selected from $\gamma$-$Fe_2O_3$, $Fe_3O_4$ or a solid solution of these components and has a mean crystallite size of less than 10 nm.

According to the present invention, there is also provided a process for the production of a multilayer magnetic recording medium, which comprises:

mixing, kneading and dispersing an isotropic magnetically soft pigment which is selected from $\gamma$-$Fe_2O_3$, $Fe_3O_4$ and a solid solution of these components and has a mean crystallite size of less than 10 nm with a binder, a solvent and further additives and applying the dispersion to a nonmagnetic substrate to form a moist lower layer;

mixing, kneading and dispersing a finely divided magnetic pigment having a coercive force $H_c$ of 100–250 kA/m with a binder, a solvent and further additives and applying the dispersion onto the lower layer to form a moist upper magnetic recording layer;

orienting the moist layers in a magnetic field;

drying the moist layers until the upper layer reaches a thickness of less than 0.5 µm; and subsequently calendering and dividing.

The coercive force $H_c$ of the pigment in the upper layer can be from 130 to 220 kA/m.

The magnetic pigment in the upper layer can be a metal pigment or metal alloy pigment.

The magnetic pigment in the upper layer can be a hexagonal ferrite pigment or a Co-modified $\gamma$-$Fe_2O_3$, Co-modified $Fe_3O_4$ or a solid solution of these components.

The isotropic magnetically soft pigment in the lower layer can have a mean crystallite size of less than 6 nm.

The lower layer can have a coercive force $H_c$ of less than 0.7 kA/m.

The lower layer can have a coercive force $H_c$ of less than 0.3 kA/m.

The amount of the magnetically soft pigment in the lower layer can be from 25 to 85% by weight, based on the weight of all pigments in the lower layer.

The amount of the magnetically soft pigment in the lower layer can be from 35 to 78% by weight, based on the weight of all pigments in the lower layer.

The magnetically soft pigment in the lower layer can have been surface-treated with an aluminum compound or a silicon compound or a mixture of the two compounds.

The magnetically soft pigment in the lower layer can be spherical or amorphous.

The lower layer may contain at least one nonmagnetic pigment in addition to the magnetically soft pigment.

The nonmagnetic pigment can be acicular, having a mean longitudinal axis of from 5 to 200 nm, or spherical or amorphous, having a mean particle size of from 5 to 180 nm.

The nonmagnetic pigment can be $\alpha$-$Fe_2O_3$.

The nonmagnetic pigment can be carbon black.

The nonmagnetic pigment can be a mixture of carbon black and $\alpha$-$Fe_2O_3$.

The present invention is also directed to a magnetic recording medium containing an upper layer, and a lower layer, said lower layer including magnetically soft pigment which is selected from $\gamma$-$Fe_2O_3$, $Fe_3O_4$ and a solid solution of these components and has a mean crystallite size of less than 10 nm.

The magnetically soft pigment can have a mean crystallite size of less than 6 nm as a pigment in a lower layer of a magnetic recording medium.

The present invention is also directed to a process for the production of a multilayer magnetic recording medium which comprises, on a nonmagnetic substrate, at least one upper binder-containing magnetic recording layer which has a thickness of less than 0.5 µm and contains a finely divided magnetic pigment having a coercive force $H_c$ of 100–250 kA/m, and at least one lower binder-containing layer which contains an isotropic magnetically soft pigment which is selected from $\gamma$-$Fe_2O_3$, $Fe_3O_4$ or a solid solution of these components and has a mean crystallite size of less than 10 nm, which comprises adding as the isotropic magnetically soft pigment in the lower layer magnetically soft pigment at least one of $\gamma\text{-Fe}_2\text{O}_3$, $\text{Fe}_3\text{O}_4$ and a solid solution of these components and has a mean crystallite size of less than 10 nm.

The present invention is also directed to a magnetic tape, magnetic card or floppy disk comprising a multilayer magnetic recording medium which comprises, on a nonmagnetic substrate, at least one upper binder-containing magnetic recording layer which has a thickness of less than 0.5 $\mu$m and contains a finely divided magnetic pigment having a coercive force $H_c$ of 100–250 kA/m, and at least one lower binder-containing layer which contains an isotropic magnetically soft pigment which is selected from $\gamma\text{-Fe}_2\text{O}_3$, $\text{Fe}_3\text{O}_4$ or a solid solution of these components and has a mean crystallite size of less than 10 mn.

Further details of the invention and preferred embodiments appear in the following description and the examples.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The novel magnetic recording medium is to be explained in more detail below.

1. Lower Layer

The lower layer of the novel magnetic recording medium contains an isotropic magnetically soft pigment which is selected from $\gamma\text{-Fe}_2\text{O}_3$, $\text{Fe}_3\text{O}_4$ and a solid solution of these components and has a mean crystallite size, determined by X-ray diffractometry, of less than 10 nm, preferably less than 6 nm, the (311) line being evaluated, and is present essentially in the form of single crystals.

The mean crystallite size, which in the case of single crystal particles determines the mean particle size, is extremely small with values of less than 10 nm, preferably less than 6 nm, which leads to advantages in the production and in particular in the properties of the magnetic recording media produced therewith. The particle size distribution of the pigment is not limited and in particular tends to be broad, i.e., the mean crystallite size is determined from the crystallite sizes of fine and coarser particles.

The magnetically soft pigments have a spherical or amorphous form. Amorphous particles are particularly preferred.

Such finely divided pigments are essential for very finely disperse dispersions for the lower layer, with the aid of which a very smooth lower layer can be produced if the addition of further pigments having considerably greater particle sizes is dispensed with. Such a finely divided lower layer contains pores and is soft and readily deformable, with the result that good smoothness of the lower layer can be produced in the calendering stage. Moreover, disadvantageous phenomena, such as chain formation of the magnetically soft particles in a magnetic field and magnetic agglomeration, which are observable with the use of magnetic material having a larger crystallite size and lead there to adverse effects with regard to the surface smoothness of the magnetic layer and the achievable RF level, are not observable.

This finely divided lower layer forms a good base for an upper magnetic recording layer to be applied thereon, with the result that its surface smoothness can be increased.

The magnetically soft pigment in the lower layer of the novel recording medium can be economically prepared in comparison with other conventionally used lower layer pigments, in particular with acicular nonmagnetic iron oxides, and, in contrast to these, requires no high-temperature step during preparation, thus avoiding sintering of the pigments in the production process. Thus, it is possible in a simple manner considerably to improve the dispersibility of the lower layer pigments, which in turn leads to smooth layers.

The magnetically soft pigment can also be surface-treated for improving its dispersing behavior. In particular, aluminum compounds and/or silicon compounds are suitable as an advantageous composition for the surface treatment.

By means of the very finely divided character of the pigment, its specific surface area (SSA) is increased. This specific surface area determined on the basis of the BET method is more than 100, in particular more than 120, m²/g. This contributes toward greater porosity in the lower layer. Through the adsorption on the large surface area of the magnetically soft pigments and through the greater pore volume in the lower layer, a larger amount of lubricants can be taken up in the lower layer in comparison with particles having a larger particle size, the layer thickness being identical. The amount of lubricant can gradually be released to the upper layer during a long period of use of the magnetic recording medium and thus keeps the coefficients of friction of the magnetic layer low even with prolonged operation of the medium. The absorption of more than 6, preferably more than 7,% by weight, based on the total weight of the pigments in the lower layer, of lubricants can thus be achieved.

Regarding the advantageous effect of a large lubricant reservoir on the mechanical properties of the tape, reference may be made here to the lecture by H. Doshita at the TISD conference on Dec. 3, 1997 in London.

The magnetically soft pigment in the lower layer of the novel recording medium has a pH of from about 7 to 10. This pH essentially corresponds to the pH of the magnetic pigments used in the medium, having a high coercive force and intended for the upper recording layer, in particular the metal pigments used there. Consequently, the same or very similar binder and solvent systems can be used both for the upper recording layer and for the lower layer, which leads to high compatibility of the two dispersions and simplifies the production of the medium.

The coercive force $H_c$ of the magnetically soft pigment is very low, in particular less than 0.7, preferably less than or equal to 0.3, kA/m. This low coercive force of the magnetically soft pigment does not have any adverse effect on the recording behavior of the upper magnetic layer. The maximum specific magnetization $\sigma_s$ (measured at 400 kA/m) of the magnetically soft pigments is from 30 to 65, preferably from 36 to 52, emu/g.

1.1 Preparation of the Lower Layer Pigment

The preparation of the very finely crystalline $\text{Fe}_3\text{O}_4$ or $\gamma\text{-Fe}_2\text{O}_3$ pigment or of a solid solution composed of these components can be carried out according to one or more of the processes described in DE 26 42 383, 30 27 012 or 44 27 821 or JP 57-175734, which are incorporated by reference herein in their entireties. The starting materials used are iron(II) salts, iron(III) salts, alkaline precipitating agents and oxidizing agents. The iron(II) salts usually used are $FeCl_2$ or $FeSO_4$. Suitable iron(III) salts are $FeCl_3$, $Fe_2(SO_4)_3$ and mixtures thereof.

MgO, $MgCO_3$, CaO, $CaSO_3$, NaOH, KOH, $NH_3$, $Na_2CO_3$, $K_2CO_3$ and other basic water-soluble or sparingly soluble compounds are used as precipitating agents.

Depending on the Fe(III)/Fe(II) ratio present, an oxidizing agent is required to oxidize all the Fe(II) to Fe(III). Atmospheric oxygen is usually used here but the use of $O_2$, $O_3$, chlorine, $H_2O_2$ or nitrates is also possible.

The preparation of magnetite on the nano scale is carried out as follows:

a) A mixture of an Fe(III) salt with an Fe(II) salt is initially taken in a reactor having a mechanism for thorough mixing. The Fe concentration is 30–70 g/l Fe. The mixture contains 50–57 mol % of Fe(III).
b) This mixture is heated to the precipitation temperature, which is from 30 to 60° C.
c) Precipitation is effected with an alkaline precipitating agent in the course of 10–60 minutes. The amount of precipitating agent is from 100 to 110% of the stoichiometric amount. The concentration is 2–10 equivalents per liter of solution.
d) Usually, after treatment is effected briefly with an oxidizing agent, usually atmospheric oxygen, in order to oxidize all the Fe(II).
e) If it is desired to prepare γ-$Fe_2O_3$ in suspension, a longer oxidation is required. Here, too, a higher volume flow rate of atmospheric oxygen is set and the suspension can be heated to 50–90° C.

The product obtained is usually filtered, washed and spray-dried.

In addition to said magnetically soft pigment, the lower layer in the novel recording medium may also contain further pigments, preferably inorganic nonmagnetic pigments.

These are as a rule pigments which improve the electrical conductivity and/or the mechanical properties of the layer. Examples of these are carbon black, graphite, tin oxide, silver powder, silver oxide, silver nitrate, copper powder or metal oxides, such as zinc oxide, barium sulfate and titanium dioxide.

Carbon black or graphite is preferably used.

However, finely divided α-$Fe_2O_3$ pigments, α-FeOOH pigments or chromium oxides, preferably chromium oxide/hydroxide pigments having a core-shell structure, can also be added as further pigments.

These pigments may be used individually or as a mixture. Preferably, carbon black alone or a mixture of carbon black and a further inorganic pigment is used.

The mean particle size of the further inorganic powder is in general from 5 to 200 nm and its specific surface area is from 30 to 200 $m^2/g$. Both acicular nonmagnetic pigments having a mean longitudinal axis of from 5 to 200 nm and spherical or amorphous nonmagnetic pigments having a mean particle size of from 5 to 180 nm can be used.

The magnetically soft pigment in the lower layer is used in an amount of from 25 to 85, preferably from 35 to 78, % by weight, based on the weight of all the pigments present in the lower layer.

The pigments described above are used with a polymeric binder in the lower layer. The type of binder is not restricted; rather, all conventionally used binders known per se are suitable. Polyurethanes and/or vinyl chloride copolymers are preferably used and may also be employed in combination with further polymeric binders and/or dispersants. In a particularly preferred embodiment, these polymeric binders have polar groups, for example sulfonate groups or phosphate groups, with the result that the dispersibility of the pigments present in the dispersion is advantageously effected.

The dispersants used are the conventional dispersants, such as fatty acids or metal salts, but also polymeric, binder-like components having a large number of polar groups.

In addition, the lower layer can also contain further different generally used additives, for example lubricants, crosslinking agents or antistatic agents.

Suitable lubricants here are all generally used lubricants, in particular the frequently used fatty acids or fatty esters.

The crosslinking agents usually used are polyisocyanates.

Antistatic agents are the anionic, cationic or natural wetting agents known from the prior art as well as the abovementioned powders for improving the electrical conductivity of the layer.

For the preparation of the dispersion for the lower layer, the magnetically soft pigments are mixed with the binders, the further inorganic pigments and all other additives together with a preferably organic solvent and are dispersed. Organic solvents which may be used are all conventionally used solvents known from the prior art, in particular tetrahydrofuran, methyl ethyl ketone, cyclohexanone or dioxane, or mixtures of two or more thereof.

2. Upper Layer

The novel magnetic recording medium comprises an upper thin magnetic recording layer.

The ferromagnetic pigment contained in this layer is preferably a ferromagnetic metal pigment or metal alloy pigment in high concentration. These pigments contain, as main components, Fe, Ni and Co and furthermore, as required, Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Mn, Zn, Sr or B, individually or as a mixture, and may have on their surface a protective coat against oxidation and other harmful influences or for improving their dispersibility.

The metal powders or metal alloy powders are preferably acicular or spindle-shaped and have a specific BET surface area of 40–90 $m^2/g$; the mean axial length of the particles is not more than 200 nm, in particular not more than 120 nm, and the axial diameter is 10–30 nm. The axial ratio is from 2 to 20. The coercive force $H_c$ of these magnetic pigments is greater than 100 kA/m and less than or equal to 250 kA/m, preferably 130–220 kA/m and more preferably 140–205 kA/m. They have a high specific saturation magnetization $\sigma_s$ of from 115 to 170 emu/g.

The ferromagnetic pigment can however also be another, finely divided magnetic pigment having a high coercive force. Known magnetic pigments having a hexagonal ferrite structure, in particular barium ferrites or strontium ferrites, which may also contain small amounts of foreign metals, such as Ti, Co, Ni, Zn, V or the like, are primarily suitable for this purpose.

These pigments are preferably finely divided lamellar pigments having a mean particle size of from about 20 to 120 nm and an axial ratio of from 2 to 10. Their coercive force $H_c$ is from 100 to 190 kA/m. They have a specific saturation magnetization of 30–70 emu/g.

Furthermore, acicular or spindle-shaped and isotropic, Co-modified γ-$Fe_2O_3$, Co-modified $Fe_3O_4$ or mixed stages thereof having a $H_c$ of 100–180 kA/m and a saturation magnetization of 50–100 emu/g may also be used as magnetic pigments of the upper layer.

These magnetic pigments are known per se and can be prepared various processes, such as by conventional known processes.

In addition to said magnetic pigment having a high coercive force, the magnetic recording layer can also contain nonmagnetic pigments which serve, for example, as abrasives or supporting pigments, such as $\alpha$-$Fe_2O_3$, $Cr_2O_3$, $TiO_2$, $SiO_2$, $Al_2O_3$, $BaSO_4$, boron nitride, $SnO_2$, $CaCO_3$, $ZrO_2$, TiC, SiC, $Sb_2O_3$, ZnO, $CeO_2$ or the like. For improving their dispersibility, these pigments may be subjected to a surface treatment.

Furthermore, the upper magnetic layer may also contain the $\alpha$-FeOOH pigments or chromium oxide/hydroxide pigments having a core-shell structure, which are mentioned above for the lower layer.

These pigments are used with a polymeric binder in the upper magnetic recording layer. Suitable binders are all binders described above for the lower layer.

The weight ratio of magnetic pigment to binder or the proportion of the magnetic pigment based on the total amount of pigment in the upper layer is from 3:1 to 7:1, or from 80 to 93%.

Further additives may be known and conventionally used dispersants, compositions for improving the electrical conductivity of the layer, lubricants, crosslinking agents and antistatic agents. The type of compounds used corresponds to the type of compounds used for these purposes for the lower layer.

For the preparation of the dispersion for the upper magnetic recording layer, the magnetic pigments are mixed with the binders, the further inorganic nonmagnetic pigments, preferably the carbon black, and the other additives together with a preferably organic solvent and are dispersed. Organic solvents used are the solvents mentioned above for the lower layer.

3. Substrate

Suitable nonmagnetic substrates for the novel magnetic recording medium are all conventional commonly used substrate materials without restriction. In particular, the known flexible substrates, such as films of polyesters, for example polyethylene terephthalate or polyethylene naphthalate, and polyolefins, cellulose triacetate, polycarbonates, polyamides, polyimides, polyamidoimides, polysulfones, aramids or aromatic polyamides, are especially suitable. However, rigid substrates of metals, glass or ceramic materials may also be used.

4. Production of the Novel Recording Medium

The process for the preparation of the dispersions for the upper and lower layers is known per se and comprises at least one kneading stage, a dispersing stage and, if required, a mixing stage, which may be provided before or after the abovementioned stages. The respective stages may each be composed of two or more steps.

In the preparation of the composition, all starting materials, i.e. the abovementioned components of the respective dispersions for the upper and lower layers, can be added to the reactor unit right at the beginning of the process or later on in the course of the process. The crosslinking agent and, if required, a crosslinking catalyst are preferably added after the end of the preparation of the dispersion.

After fine filtration through narrow-mesh filters having a size of not more than 5 $\mu$m, the dispersions are applied to the nonmagnetic substrate by means of a conventional coating apparatus at speeds in the conventional range and are oriented in a magnetic field, if necessary in a preferred direction, dried and then subjected to a calendar treatment and, if required, a further surface-smoothing treatment. The preferred direction for the magnetic field treatment may be along the direction of application of the dispersion or tilted at an angle of up to 35° relative to the direction. However, it is also possible to carry out a magnetic field treatment with the object of producing a two- or three-dimensionally isotropic orientation of the magnetic particles.

For the production of the novel magnetic recording media, the coating can be effected by means of bar coaters, knife coaters, blade coaters, extrusion coaters, reverse-roll coaters or combinations thereof. The layers can be applied simultaneously or in succession by the wet/wet method or the wet/dry method. A wet/wet application method is particularly preferred since the application of thin upper layers is facilitated thereby.

For the production of the novel magnetic recording medium, a knife coater having at least one outlet orifice, preferably two or more outlet orifices, which is disclosed in DE-A-195 04 930, the disclosure of which is incorporated by reference herein in its entirety, is preferably used.

An extrusion coater having at least one outlet orifice, preferably two or more outlet orifices, is also suitable, the edge or the air gap of a magnet being opposite the orifices, on the other side of the flexible substrate, and the field lines of said magnet being substantially parallel to the running direction of the substrate. Such arrangements are disclosed in EP-A-0 654 165 or FR 2 734 500, the disclosures of which are incorporated by reference herein in their entireties.

After the drying and calendaring, which follow the coating, the magnetic recording medium thus obtained is cut or punched into the desired form for use and is subjected to the conventional electromagnetic and mechanical tests.

The novel magnetic recording medium preferably is composed of a nonmagnetic substrate, a lower magnetic layer having the abovementioned composition and an upper magnetic recording layer having the abovementioned composition. The thickness of the lower magnetic layer is from 0.5 to 3 $\mu$m, preferably from 1.0 to 2.0 $\mu$m. The thickness of the upper magnetic recording layer is less than 0.5 $\mu$m, in particular less than 0.3 $\mu$m, preferably from 0.15 to 0.25 $\mu$m.

Both layers may comprise individual layers or a composite of in each case a plurality of layers, provided that the total thickness of the upper and lower layers remains in the abovementioned range.

It is possible for the back of the nonmagnetic substrate to be coated with the same layer composition as described above. It is also possible to apply a backing coating known from the prior art and having a generally used composition to the back of the nonmagnetic substrate. An adhesion-promoting layer may also be applied between the nonmagnetic substrate and the lower layer which contains the magnetically soft pigment. These layers can each be applied separately or they can be applied simultaneously or in succession with the upper and lower layers described above.

The magnetic recording medium according to the present invention has an improved surface smoothness of the magnetic layer, very good general electromagnetic properties and an RF level which is improved in comparison with media having conventional magnetically soft pigments in the lower layer, and can store a sufficiently-large amount of lubricants in the lower layer in order to have stable running properties in particular with regard to the coefficients of friction on prolonged running. This medium is therefore very useful for recording digital data with a high storage density.

The invention is illustrated by the following Examples, which are provided for the purpose of representation, and are not to be construed as limiting the scope of the invention. Unless stated otherwise, all percentages, parts, etc., are by weight.

EXAMPLES OF THE INVENTION

Production of the Magnetic Recording Medium
Upper Layer

A mixture of 100 parts by weight of a commercial ferromagnetic metal pigment having the main components Fe and Co ($H_c$ 183 kA/m, $\sigma_s$ 140 emu/g, SSA 55 m$^2$/g, mean particle length 85 nm), 13 parts by weight of $\alpha$-Al$_2$O$_3$ (diameter of primary particles 180 nm), 10 parts by weight of a PVC copolymer (Mn 11 000, Tg 68° C., containing sulfonate groups), 3.5 parts by weight of a PES-PU copolymer having dispersing activity (from Morton, Mn 20 000, containing sulfonate groups), 2 parts by weight of stearic acid, 1 part by weight of myristic acid and 15 parts by weight each of tetrahydrofuran and dioxane was kneaded in a batch kneader (IKA high-speed kneader of the type HKD 10, from IKA Maschinenbau, Staufen) for 2 hours. The kneaded material was then mixed in portions with a mixture of 155 parts by weight each of tetrahydrofuran and dioxane in a dissolver with vigorous stirring and then dispersed for 10 hours using a stirred ball mill. 1 part by weight of butyl stearate, 4 parts by weight of a 50% strength solution of the reaction product of 3 mol of tolylene diisocyanate with 1 mol of trimethylolpropane in tetrahydrofuran and, in portions, a mixture of 44 parts by weight each of tetrahydrofuran and dioxane were then added to the dispersion with vigorous stirring. After filtration through a filter of 2 $\mu$m pore size, a homogeneous, finely divided, flocculate-free dispersion for the upper layer was obtained, which dispersion was stable to settling and ready for application as a coat.

Lower Layer

A mixture of 100 parts by weight of a magnetically soft lower layer pigment stated in Table 1, 32 parts by weight of carbon black (average primary particle size 25 nm, SSA 115 m$^2$/g), 13 parts by weight of a PVC copolymer (Mn 11 000, Tg 68° C., containing sulfonate groups), 7.5 parts by weight of a commercial polyurethane having dispersing activity and polar anchor groups (from Morton, Tg 70° C.), 7.5 parts by weight of a second commercial polyurethane having polar anchor groups (Tg 35° C., from Morton), 2 parts by weight of stearic acid and 27 parts by weight each of tetrahydrofuran and dioxane was kneaded in a batch kneader for 3 hours. The kneaded material was then mixed in portions with a mixture of 234 parts by weight each of tetrahydrofuran and dioxane in a dissolver with vigorous stirring and then dispersed for 15 hours in a stirred ball mill. 6.3 parts by weight of a 50% strength solution of the reaction product of 3 mol of tolylene diisocyanate with 1 mol of trimethylolpropane in tetrahydrofuran were then added to the dispersion with vigorous stirring. After filtration through a filter of 2 $\mu$m pore size, a homogeneous, finely divided, flocculate-free dispersion was obtained, which dispersion was stable to settling and ready for application as a coat.

Backing Coating 25.5 parts by weight of a mixture of tetrahydrofuran and dioxane in the ratio 1:1 were mixed with 1.2 parts by weight of a polyester/polyurethane binder in the form of a block copolymer, 0.44 part by weight of a polyvinyl formal, 0.6 part by weight of a polyolefin (Mw 3 000), 0.06 part by weight of an isomeric C18-carboxylic acid, 0.2 part by weight of dispersant, 3.4 parts by weight of a conductive carbon black, 0.87 part by weight of a precipitated silica and 0.29 part by weight of a supporting pigment. The polymeric binder components were first dissolved in a part of the solvent mixture. Dispersing was then carried out for 10–15 hours in a stirred ball mill. In a second phase, a further 24.4 parts by weight of the solvent mixture, 1.4 parts by weight of the polyester/polyurethane binder in the form of a block copolymer, 0.73 part by weight of the polyolefin (Mw 3 000) and 0.04 part by weight of dispersant and additives were metered in. The polymeric components were likewise brought into solution beforehand in a part of the solvent. The mixture was then dispersed in a stirred ball mill or in a toothed colloid mill for thorough mixing. The dispersion thus obtained was mixed, in a final step immediately before the coating, with a further 13.4 parts by weight of the solvent mixture and with 1.8 parts by weight of a crosslinking agent.

Recording Medium

The dispersion for the backing coating was applied to the back of a polyethylene terephthalate film using a knife coater, so that a layer thickness of 0.5–1.5 $\mu$m was obtained after drying at 60 ° –80° C.

The upper layer dispersion and lower layer dispersion were applied wet-in-wet, by means of a dual knife coater, to the front of the polyethylene terephthalate film provided with a backing coating. The thickness of the upper magnetic layer containing metal pigment was as far as possible identical in every example, i.e. 0.25±0.03 $\mu$m, in order better to be able to show the influences of the lower magnetic layer. In the layer thickness range of <0.5 $\mu$m for the upper layer, it was shown, in experiments not described here, that the thickness of the upper layer has only an insignificant effect on the magnetic lower layer. If, however, the thickness of the upper layer is substantially greater than 0.5 $\mu$m, an increase in the RF level can no longer be detected. The thickness of the lower layer is stated in each case in Table 1. Before drying, the coated film was passed through a magnetic orientation zone consisting of a coil having a magnetic field strength of 200 kA/m for orientation of the ferroelectric pigments. After drying at 80° C., the film web was calendered using a steel-steel calender with 6 gaps at 80° C. and at a nip pressure of 2 000 N/cm and was then slit into video tapes of different widths.

The measurement of the magnetic properties of the tapes and of the lower layers was carried out by means of a vibrating sample magnetometer at a maximum field strength of 400 kA/m.

In order to determine the RF level, 7.7 MHz signals (corresponding to a wavelength of 0.49 $\mu$m) were recorded on the tape by means of an Hi8 recorder. The output level of the playback signal of the same frequency was determined using an oscillograph. The higher the RF level, the better is the tape.

The crystallite size of the powders was measured by the known standard methods using a D5000 X-ray diffractometer from Siemens (X-ray tube copper, detector aperture 0.1 mm, divergence and scattered beam aperture variable, measuring rate 0.5°/minute). The (311) line was evaluated.

The roughness of the tape surface was measured by means of an optical interference method. For this purpose, the commercial apparatus TOPO 3D from Wyko was used and the $R_a$ value was determined.

In order to work out the decisive effect of the lower layer, the metal pigment described above and being a typical pigment used in DVC tapes was employed in the upper layer in all examples.

Examples 1 and 2 describe novel tape-like recording media comprising two different magnetically soft lower layer pigments. In example 3, twice the amount of lubricant (stearic acid) was added in the lower layer. It was found that as a result the friction under standard temperature and humidity conditions was improved by 10% but that in particular the coefficient of friction after continuous operation under humid and warm conditions (40° C., 85% r.h.) was also reduced by about 25%.

Example 4 is a novel example in which half the magnetically soft lower layer pigment was replaced by an acicular $\alpha$-Fe$_2$O$_3$ (particle length 120 nm, particle thickness 20 nm) otherwise usual in nonmagnetic lower layers.

The measured values in Table 1 which relate to this example show that, even the addition of $\alpha$-Fe$_2$O$_3$ to the magnetically soft lower layer pigment in the weight of 1:1, the advantageous effects of the invention on the roughness of the surface and RF level are present.

TABLE 1

| Exam-ple No. | Lower layer pigment | | | Lower layer | | | | Tape | |
|---|---|---|---|---|---|---|---|---|---|
| | Type | d (cr) nm | Fe(II) % by wt. | d μm | $H_c$ kA/m | Φm nWb/m | Mr/ Mm | $R_a$ nm | RF dB |
| 1 | a | 5.0 | 9 | 1.2 | 0.2 | 102 | 0.02 | 4.2 | 1.3 |
| 2 | b | 4.5 | 2 | 1.1 | 0.1 | 89 | 0.01 | 5.0 | 0.9 |
| 3 | b | 4.5 | 2 | 1.3 | 0.1 | 92 | 0.01 | 4.7 | 1.1 |
| 4 | c + $Fe_2O_3$ | 5.5 | 3 | 1.3 | 0.3 | 47 | 0.01 | 4.8 | 1.0 |

COMPARATIVE EXAMPLE(TABLE 2)

The comparative examples, defined as examples S to 9, were produced by the processes as described above for the examples of the invention.

Example 5 describes a double-layer tape having a non-magnetic lower layer which, in addition to carbon black, contains only an acicular nonmagnetic lower layer pigment of the type described in the example 4. The RF level of this tape is somewhat lower than in the novel examples. Examples 6 to 9 contain, in the lower layer, magnetically soft particles having a larger crystallite size. The double-layer tape according to example 9 was used as a reference tape for the RF level.

The values for the RF level for these comparative examples are about 1 dB than in the novel examples.

The roughness values of examples 6 to 9 are all higher than those of the novel examples.

TABLE 2

| Exam-ple No. | Lower layer pigment | | | Lower layer | | | | Tape | |
|---|---|---|---|---|---|---|---|---|---|
| | Type | d (cr) nm | Fe(II) % by wt. | d μm | $H_c$ kA/m | Φm nWb/m | Mr/ Mm | $R_a$ nm | RF dB |
| 5 | $Fe_2O_3$ | — | — | — | — | — | — | 4.6 | 0.7 |
| 6 | d | 12.0 | 3 | 1.3 | 2.7 | 142 | 0.14 | 6.2 | −0.4 |
| 7 | e | 14.5 | 2 | 1.4 | 0.8 | 150 | 0.11 | 5.7 | −0.2 |
| 8 | f | 15.0 | 2 | 1.4 | 1.1 | 128 | 0.11 | 6.0 | −0.1 |
| 9 | g | 11.5 | 7 | 1.4 | 3.5 | 124 | 0.17 | 5.6 | 0 |

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A magnetic recording medium containing an upper layer, and a lower layer, said lower layer including magnetically soft pigment which is selected from $\gamma$-$Fe_2O_3$, $Fe_3O_4$, and a solid solution of these components and has a mean crystallite size of less than 10 nm, and a coercive force $H_c$ of less than 0.7 kA/m.

2. The magnetic recording medium as claimed in claim 1, wherein the magnetically soft pigment has a mean crystallite size of less than 8 nm as a pigment in a lower layer of a magnetic recording medium.

3. The magnetic recording medium us claimed in claim 1, wherein the lower layer has a coercive force $H_c$ of less than 0.3 kA/m.

4. The magnetic recording medium as claimed in claim 1, wherein the isotropic magnetically soft pigment has a specific surface area determined on the basis, of BET method is more than 100 $m_2$/g.

5. The magnetic recording medium as claimed in claim 4, wherein the isotropic magnetically soft pigment has a specific surface area determined on the basis of BET method is more than 120 $m_2$/g.

6. A multilayer magnetic recording medium which comprises, on a nonmagnetic substrate, at least one upper binder-containing magnetic recording layer which has a thickness of less than 0.5 μm and contains finely divided magnetic pigment having a coercive force $H_c$ of 100–250 kA/m, at least one lower binder-containing layer which contains an isotropic magnetically soft pigment which is selected from $\gamma$-$Fe_2O_3$, $Fe_3O_4$ or a solid solution of these components and has a mean crystallite size of less than 10 nm, and the lower layer has a coercive force $H_c$ of less than 0.7 kA/m.

7. A magnetic recording medium as claimed in claim 6, wherein the coercive force $H_c$ of the pigment in the upper layer is from 130 to 220 kA/m.

8. A magnetic recording medium as claimed in claim 6, wherein the magnetic pigment in the upper layer is a metal pigment or metal alloy pigment.

9. A magnetic recording medium as claimed in claim 6, wherein the magnetic pigment in the upper layer is a hexagonal ferrite pigment or a Co-modified $\gamma$-$Fe_2O_3$, Co-modified $Fe_3O_4$ or a solid solution of these components.

10. A magnetic recording medium as claimed in claim 6, wherein the isotropic magnetically soft pigment in the lower layer has a mean crystallite size of less than 6 nm.

11. A magnetic recording medium as claimed in claim 6, wherein the lower layer has a coercive force $H_c$ of less than 0.3 kA/m.

12. A magnetic recording medium as claimed in claim 6, wherein the amount of the magnetically soft pigment in the lower layer is from 25 to 85% by weight, based on the weight of all pigments in the lower layer.

13. A magnetic recording medium as claimed in claim 6, wherein the amount of the magnetically soft pigment in the lower layer is from 35 to 78% by weight, based on the weight of all pigments in the lower layer.

14. A magnetic recording medium as claimed in claim 6, wherein the magnetically soft pigment in the lower layer has been surface-treated with an aluminum compound or a silicon compound or a mixture of the two compounds.

15. A magnetic recording medium as claimed in claim 6, wherein the magnetically soft pigment in the lower layer is spherical or amorphous.

16. A magnetic recording medium as claimed in claim 6, wherein the lower layer contains at least one nonmagnetic pigment in addition to the magnetically soft pigment.

17. A magnetic recording medium as claimed in claim 16, wherein the nonmagnetic pigment is acicular, having a mean longitudinal axis of from 5 to 200 nm, or spherical or amorphous, having a mean particle size of from 5 to 180 nm.

18. A magnetic recording medium as claimed in claim 16, wherein the nonmagnetic pigment is $\alpha$-$Fe_2O_3$.

19. A magnetic recording medium as claimed in claim 16, wherein the nonmagnetic pigment is carbon black.

20. A magnetic recording medium as claimed in claim 16, wherein the nonmagnetic pigment is a mixture of carbon black and $\alpha$-$Fe_2O_3$.

21. The magnetic recording medium as claimed in claim 6, wherein the isotropic magnetically soft pigment has a specific surface area determined on the basis of BET method is more than 100 $m_2/g$.

22. The magnetic recording medium as claimed in claim 21, wherein the isotropic magnetically soft pigment has a specific surface area determined on the basis of BET method is more than 120 $m_2/g$.

23. A magnetic tap, magnetic card or floppy disk comprising a multilayer magnetic recording medium which comprises, on a nonmagnetic substrate, at least one upper binder-containing magnetic recording layer which has a thickness of less than 0.5 $\mu$m and contains a finely divided magnetic pigment having a coercive force $H_c$ of 100–250 kA/m, and at least one lower binder-containing layer which contains an isotropic magnetically soft pigment which is selected from $\gamma$-$Fe_2O_3$, $Fe_3O_4$, or a solid solution of these components and has a mean crystallite size of less than 10 nm, end the lower layer has a coercive force $H_c$ of less than 0.7 kA/m.

24. The magnetic recording medium as claimed in claim 23, wherein the lower layer has a coercive force $H_c$ of less than 0.3 kA/m.

* * * * *